(12) United States Patent
Hawley

(10) Patent No.: US 9,178,420 B1
(45) Date of Patent: Nov. 3, 2015

(54) INDUCTIVE BYPASS, STORAGE AND RELEASE IMPROVES BUCK RESPONSE

(75) Inventor: Stephen Hawley, Emerald Hills, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 306 days.

(21) Appl. No.: 13/567,840

(22) Filed: Aug. 6, 2012

(51) Int. Cl.
*H02M 3/158* (2006.01)
*H02M 3/157* (2006.01)
*H02M 1/00* (2007.01)

(52) U.S. Cl.
CPC ...... *H02M 3/157* (2013.01); *H02M 2001/0019* (2013.01); *H02M 2001/0048* (2013.01)

(58) Field of Classification Search
USPC .................................. 323/22, 222
See application file for complete search history.

(56) References Cited

U.S. PATENT DOCUMENTS

| | | | |
|---|---|---|---|
| 3,641,422 A * | 2/1972 | Farnsworth et al. | 323/224 |
| 6,271,651 B1 * | 8/2001 | Stratakos et al. | 323/282 |
| 6,509,721 B1 * | 1/2003 | Liebler | 323/224 |
| 7,609,037 B1 * | 10/2009 | Herbert | 323/266 |
| 8,552,697 B2 * | 10/2013 | Lawson et al. | 323/222 |
| 2003/0117752 A1 * | 6/2003 | Gilbert et al. | 361/18 |
| 2009/0115388 A1 * | 5/2009 | Miyazaki et al. | 323/282 |
| 2010/0109630 A1 * | 5/2010 | Latham et al. | 323/282 |

* cited by examiner

*Primary Examiner* — Harry Behm
*Assistant Examiner* — Peter Novak
(74) *Attorney, Agent, or Firm* — North Weber & Baugh LLP

(57) ABSTRACT

Various embodiments of the invention improve the dynamic response and output voltage accuracy in buck DC-DC converters. In certain embodiments, power efficiency is improved by storing and recycling energy that is otherwise lost during successive load transient events.

18 Claims, 6 Drawing Sheets

INDUCTIVE BYPASS, STORAGE AND RELEASE IMPROVES BUCK RESPONSE

BACKGROUND

A. Technical Field

The present invention relates to DC-DC buck voltage circuits, and particularly, to systems, devices, and methods of suppressing transient load responses in DC-DC buck voltage converters.

B. Background of the Invention

Buck or step-down DC-DC converters efficiently convert a high input DC voltage into a specified lower output DC voltage at a higher current. Buck converters are widely used in processor and power applications for consumer electronic equipment, such as desktop and portable computers; in communications equipment, such as handheld battery powered devices; in industrial applications; and in automotive applications. Buck converters often require exceptional output voltage accuracy, a reduced transient load response, and fast output voltage programming. Transient load requirements are important in low-voltage applications which are subject to fast changing load conditions or require frequent transitions between output voltage settings during operation. High-speed, high-accuracy system loads include central processing units, baseband, application and graphics processors, as well as power amplifiers. Slew rate and efficiency are important in dynamic voltage scaling and power amplifier applications.

The inductance of a DC-DC buck converter is sized to store adequate magnetic energy and keep output current and voltage ripple at reasonably low values. However, the transient output response to fast changes in system voltage and load current is limited by the current slew rate of the inductor. Additionally, prior art DC-DC buck converters which allow large output slew rate, suffer from low operating efficiency. Therefore, a need exists to overcome the deficiencies and inadequacies of the prior art.

SUMMARY OF THE INVENTION

Various embodiments of the invention allow for improved transient output response in buck DC-DC converters. This is accomplished simultaneously by passing and storing energy followed by subsequent release of the stored energy during successive output transient events; output load transients or voltage programming commands. In particular, certain embodiments of the invention allow for reducing output voltage deviations for a given driving voltage when a dynamic system voltage or load changes occur. This is accomplished by operating one or more switches in various states. In one embodiment, a switch is coupled in parallel with an energy storage element and operates in a linear mode, which increases the total current slew rate to a system load, thereby eliminating inductor current slew rate limitations inherent in buck DC-DC converters. In another embodiment, the switch allows a circulating current to temporarily store energy within an inductor until, in a subsequent positive voltage or current step, the energy is released to the system load, thereby allowing for a reduced output voltage deviation, reduced output capacitance and improved power efficiency of the circuit.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1A:
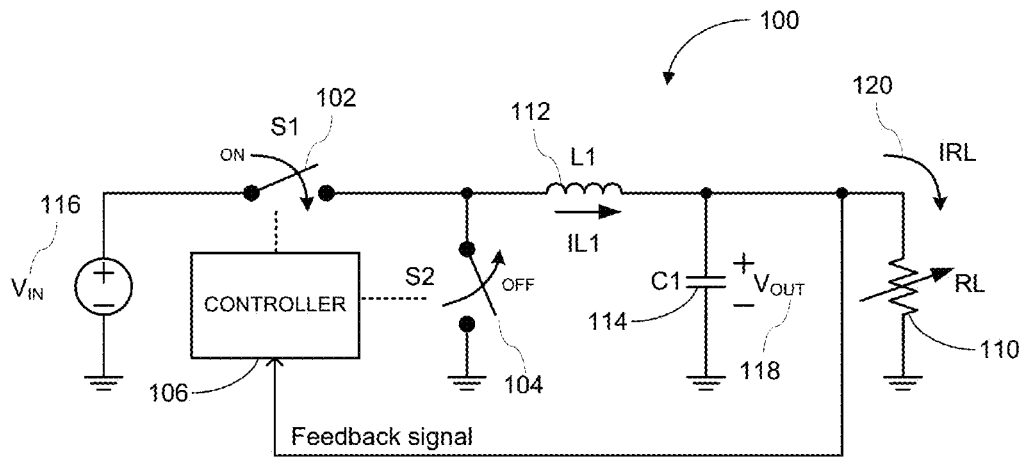
FIG. 1A is a schematic of a prior art buck converter with transient system load during an "ON" transient.

FIG. 1A is a schematic of a prior art buck converter with transient system load during an "ON" transient. Buck converter 100 regulates its output voltage by adjusting the operating duty cycle of switches 102 and 104 that are turned ON during their conduction state and OFF during their non-conduction state. The duty cycle of buck converter 100 is equal to the ratio of ON time of switch 102 to the total switching interval. Assuming that the step of output load current 120 has an instantaneous slew rate and, assuming further, that the response of controller 106 is instantaneous, it can be shown that the output voltage deviation, $\pm\Delta V_{OUT}$, is proportional to the load current step size and to the slew rate, $\pm dI_{OUT}/dt$, of output load current 120.

Figure 2:
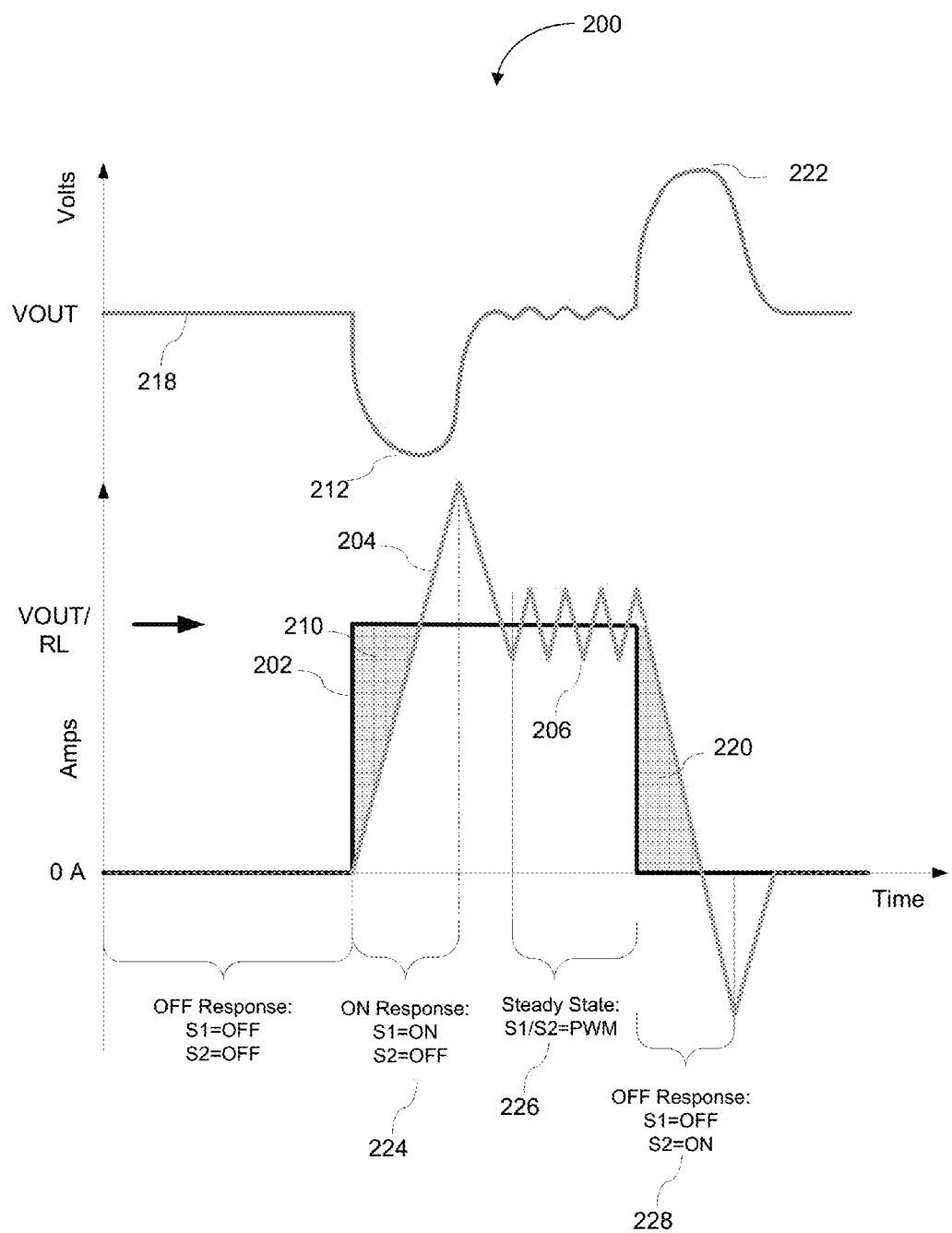
FIG. 2 shows exemplary voltage and current output waveforms of a prior art buck converter in response to load transients.

During a positive load transient, for example when load 110 is coupled to capacitor 114, output load current 120 is stepped to the level of $I_{OUT}=V_{OUT}/RL$, as shown in FIG. 2. Controller 106 responds to the feedback signal by activating switch 102 ON and switch 104 OFF. Assuming that input voltage 116 and output voltage 118 are constant, the positive inductor slew rate $+d(I_{L1})/dt$ through inductor 112 can be calculated as:

$$\frac{+d(I_{L1})}{dt} = \frac{+\Delta I_{L1}}{\Delta T_{ON}} = \frac{V_{IN} - V_{OUT}}{L1}$$

Figure 1B:
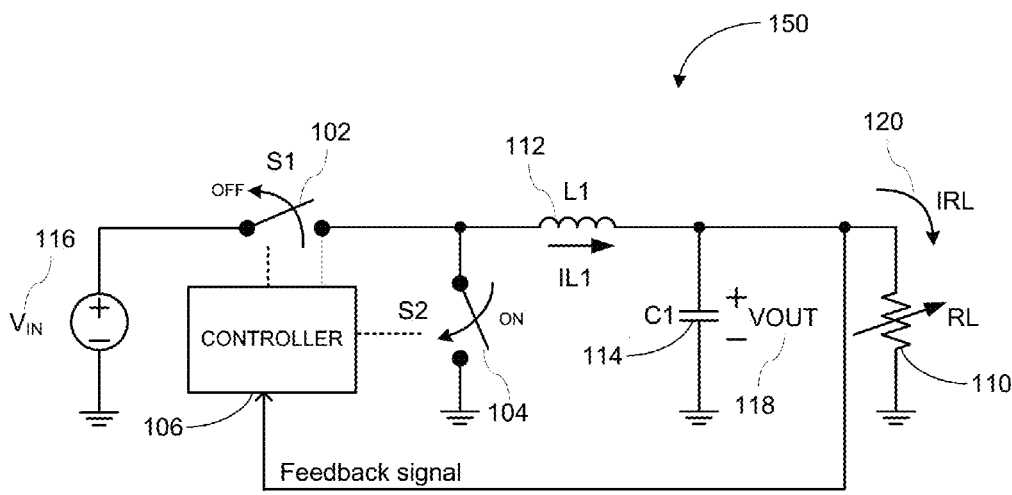
FIG. 1B is a schematic of a prior art buck converter with transient system load during an "OFF" transient.

FIG. 1B is a schematic of a prior art buck converter with transient system load during an "OFF" transient. During a negative load transient, for example when load 110 is uncoupled from output capacitor 114, excess energy stored in inductor 112 is released to output capacitor 114 resulting in an overcharging of output capacitor 114, as shown in FIG. 2. Controller 106 responds to the feedback signal by activating switch 102 OFF and switch 104 ON. Assuming that input voltage 116 and output voltage 118 are constant, the negative inductor slew rate $+d(I_{L1})/dt$ through inductor 112 can be calculated as:

$$\frac{-d(I_{L1})}{dt} = \frac{-\Delta I_{L1}}{\Delta T_{OFF}} = \frac{-V_{OUT}}{L1}$$

As can be seen from the previous two equations, one possible approach for increasing the inductor slew rate is to reduce the size of inductor 112, which is an impractical approach due to poor DC pass filtering and high output voltage ripple seen at the load. Some prior art solutions provide for a ground switch having a lossy component for the purpose of dissipating the excess energy stored in inductor 112 to prevent an overcharging of output capacitor 114. However, this approach is very inefficient.

FIG. 2 shows exemplary voltage and current output waveforms of a prior art buck converter in response to load transients and graphically highlights the voltage output overshoot and undershoot problem. The buck converter is a prior art buck converter, such as the one depicted in FIG. 1. In response to a positive load transient caused by connecting the buck converter to a purely resistive load, output load current 202 instantly steps from 0 A to $V_{OUT}/R_L$. Output voltage 218 depicts the voltage present at the output capacitor C1, shown in FIG. 1. Inductor current 204 through the inductor is rate limited by a slew rate such that, following the positive load transient, inductor current 204 reaches steady state condition 206 only after an initial time period. At steady state, the controller alternates between turning ON switches S1 and S2 in a standard duty cycle to maintain an average inductor current that is equal to the output current, i.e. $I_{L1\_AVG}=I_{OUT}$.

In FIG. 2, area 210 represents the difference between output load current 202 and inductor current 204 prior to the two values crossing each other during the time depicted as ON response time 224. Area 210 is proportional to the amount of charge removed from output capacitor C1 shown in FIG. 1. It is also proportional to output voltage undershoot 212, i.e. to the drop in output voltage 218 that exists during ON response time 224.

In response to a negative load transient caused by disconnecting purely resistive load $R_L$, output load current 202 instantly steps from $V_{OUT}/R_L$ to 0 A. Output voltage overshoot 222 depicts the output voltage present at the output capacitor C1. Inductor current 204 through the inductor drops from its steady state level $V_{OUT}/R_L$ to a negative current value. However, inductor current 204 is limited in its rate of change by the negative inductive slew rate. Thus, during the initial time period after the system load is removed, the buck converter is unable to instantly reduce the current flow through the inductor. The time period before inductor current 204 is reduced to an average of 0A is depicted as OFF response time 228.

Area 220 represents the difference between load current 202 and inductor current 204. Area 310 is proportional to the amount of charge added to the output capacitor C1 and also proportional to output voltage overshoot 222.

Figure 3:
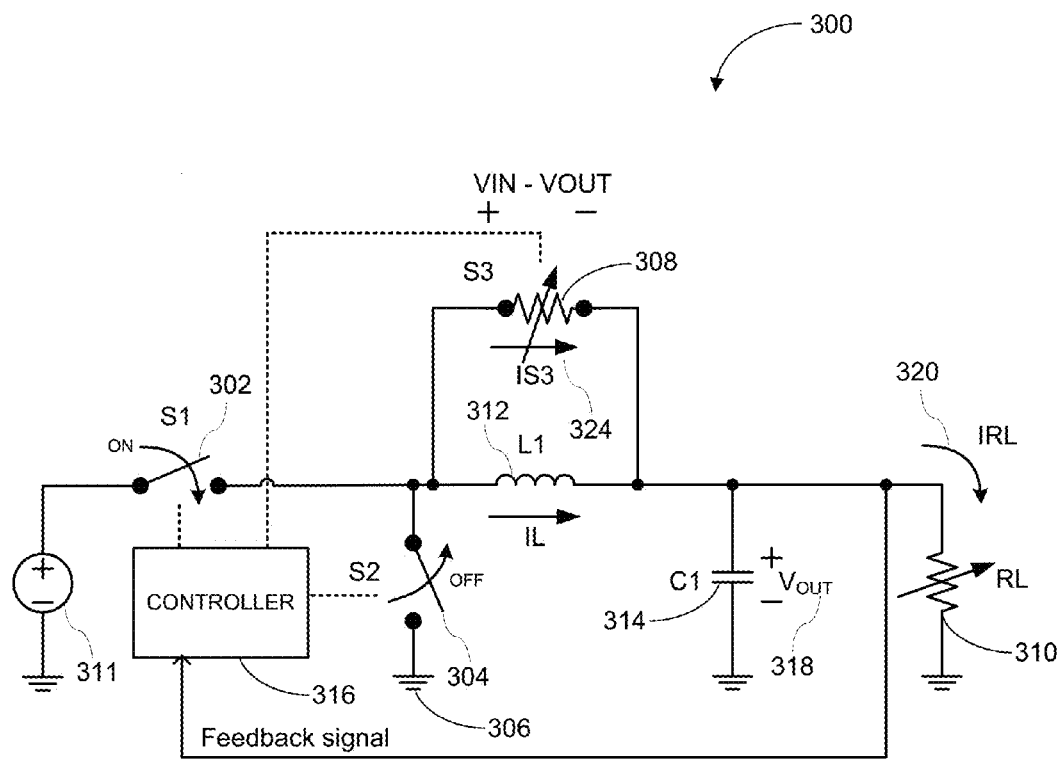
FIG. 3 is a schematic of an illustrative buck converter during a positive load transient according to various embodiments.

FIG. 3 shows a buck converter during a positive load transient according to various embodiments. Controller 316 is coupled to control one or more switches. Switch 302 is coupled between a DC voltage source 311 and inductor 312. Switch 304 is shunted from one leg of inductor 312 to a ground reference 306. Switch 308 is coupled between controller 316 and system load 310, for example, via an output switch (not shown). Switch 308 is further coupled in parallel to inductor 312. The parallel combination of switch 308 and inductor 312 is coupled to output capacitor 312 which is shunted to ground reference 306. Switches 302 and 304 can be any type of switch, such as bipolar devices, complementary metal-oxide-semiconductors, junction gate field-effect transistors, metal-oxide semiconductor field-effect transistors, or other switches known to one skilled in the art, whereas switch 308 is a bidirectional switch capable of passing current in two directions. In certain embodiments, switch 308 is capable of being controlled by controller 316 to operate in multiple modes, examples of which include: ON, OFF, and in linear mode.

In various embodiments, output capacitor 314 is shunted to ground reference 306 and couples buck converter 300 to system load 310 that may be purely resistive or contain additional reactive components. Buck converter 300 is designed to convert a relatively high input DC voltage signal 311, for example 24V to another relatively lower output DC voltage signal level 418. A positive load transient is generated as a result of coupling buck converter 300 to system load 310. In one embodiment, following the positive load transient, controller 316 responds to the feedback signal and controls 1) switch 302 to turn ON to produce a low impedance condition that allows maximum current flow, 2) switch 304 to turn OFF to produce a high impedance condition that allows only a minimum current to flow, and 3) switch 308 to operate in a linear voltage regulation mode.

When switch 308 operates in linear mode, it functions like a linear regulator that passes an additional current 324 from input source 311 to output capacitor 314. Switch 308 is sized to maintain load current 320 for a given differential input voltage of source 311 to output voltage 318. In FIG. 3, switch 308 is depicted as a variable resistor that is controlled by controller 316 to carry current 324 that allows the circuit to maintain a predetermined output voltage 318, which would otherwise not be possible when switch S1 is closed. The additional current 324 in the circuit allows load current 312 in system load 310 to ramp up more quickly than it would without the existence of switch 308. The resulting increase in current slew rate in system load 310 reduces the output voltage undershoot. The current slew rate is determined by the speed and capability of controller 316 to drive switch 308 in response to the feedback signal.

In one embodiment, following a negative load transient, in response to the feedback signal controller 316 controls switch 302 to turn OFF, switch 304 to turn OFF, and switch 308 to turn ON so as to allow the energy that has built up in inductor 312 to be maintained by circulating through 308 during the OFF response until, in the subsequent load step when system load 310 is recoupled to buck converter 300, the energy can be recycled by being redirected to system load 310 to sustain load current 320.

At steady state, controller 316 times switch 308 to turn OFF, such that all of load current 320 passes through inductor 312, and the circuit operates in the same manner as a prior art buck converter. At steady state, controller 316 times the duty cycle of switches 302 and 304 to alternately turn ON such as to maintain an average current through inductor 312 that equals load current 320.

Figure 4:
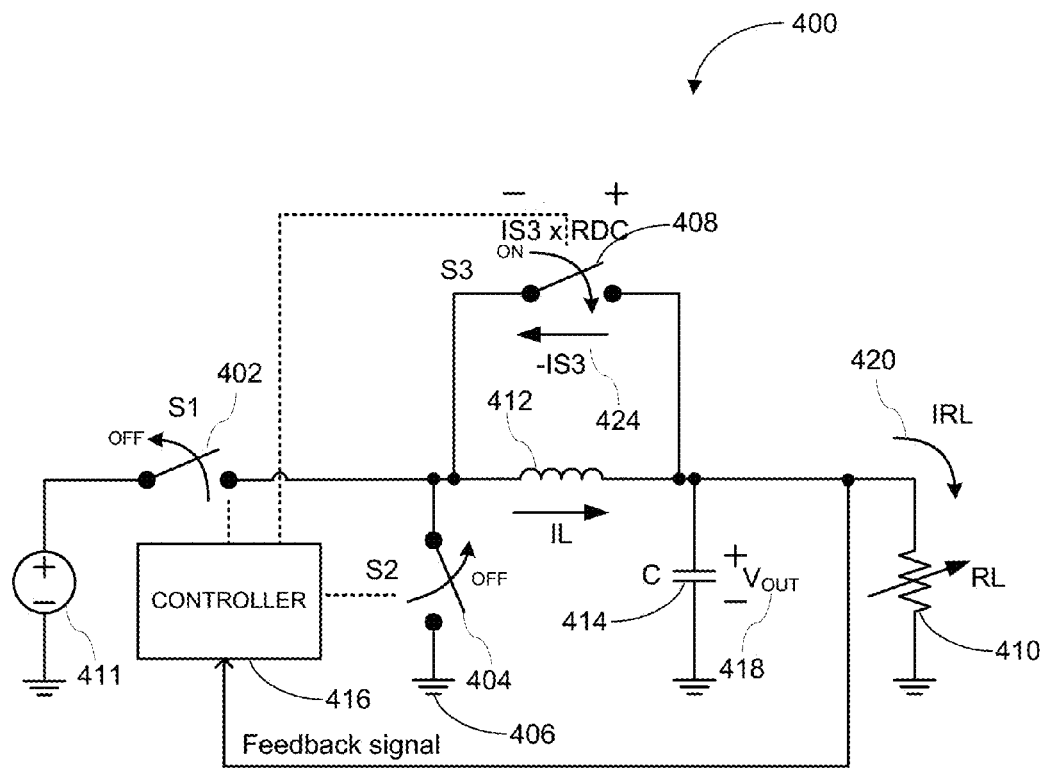
FIG. 4 shows a buck converter during a negative load transient according to various embodiments.

It will be appreciated by one skilled in the art that only one of many possible configurations for switches 302, 304 and 308 are illustrated FIGS. 3 and 4, and that multiple switches may be coupled to multiple system loads to achieve the same improvement in load transient response.

FIG. 4 shows a buck converter during a negative load transient according to various embodiments. Switch 408 is a bi-directional switch coupled between controller 416 and system load 410, for example via an output switch (not shown). Switch 408 is further coupled in parallel to inductor 412 and is shunted to ground 406 via output capacitor 414. System load 410 is typically a resistive load.

A negative load transient is generated as a result of uncoupling buck converter 400 from system load 410, for example, by removing the output load resistor RL (OFF response). During the OFF response, controller 416 may respond to the feedback signal which detects an overshoot at the output voltage and control switch 402 to turn OFF, switch 404 to turn OFF, and switch 408 to turn ON. In ON mode, negative current 424 (−IS3) is maintained through switch 408. Negative current 424 flows in a direction opposite to the linear mode and maintains previously stored electrical energy within inductor 412. During the subsequent load step (ON response), the output load resistor is decreased and switch 408 is turned OFF again in response to the feedback signal, which allows stored energy 412 to be redirected to system load 410. The stored inductor energy decreases the energy required to build up in inductor 412 to sustain output current 420 through system load 410, thereby, increasing the operating efficiency of circuit 400.

Figure 5:
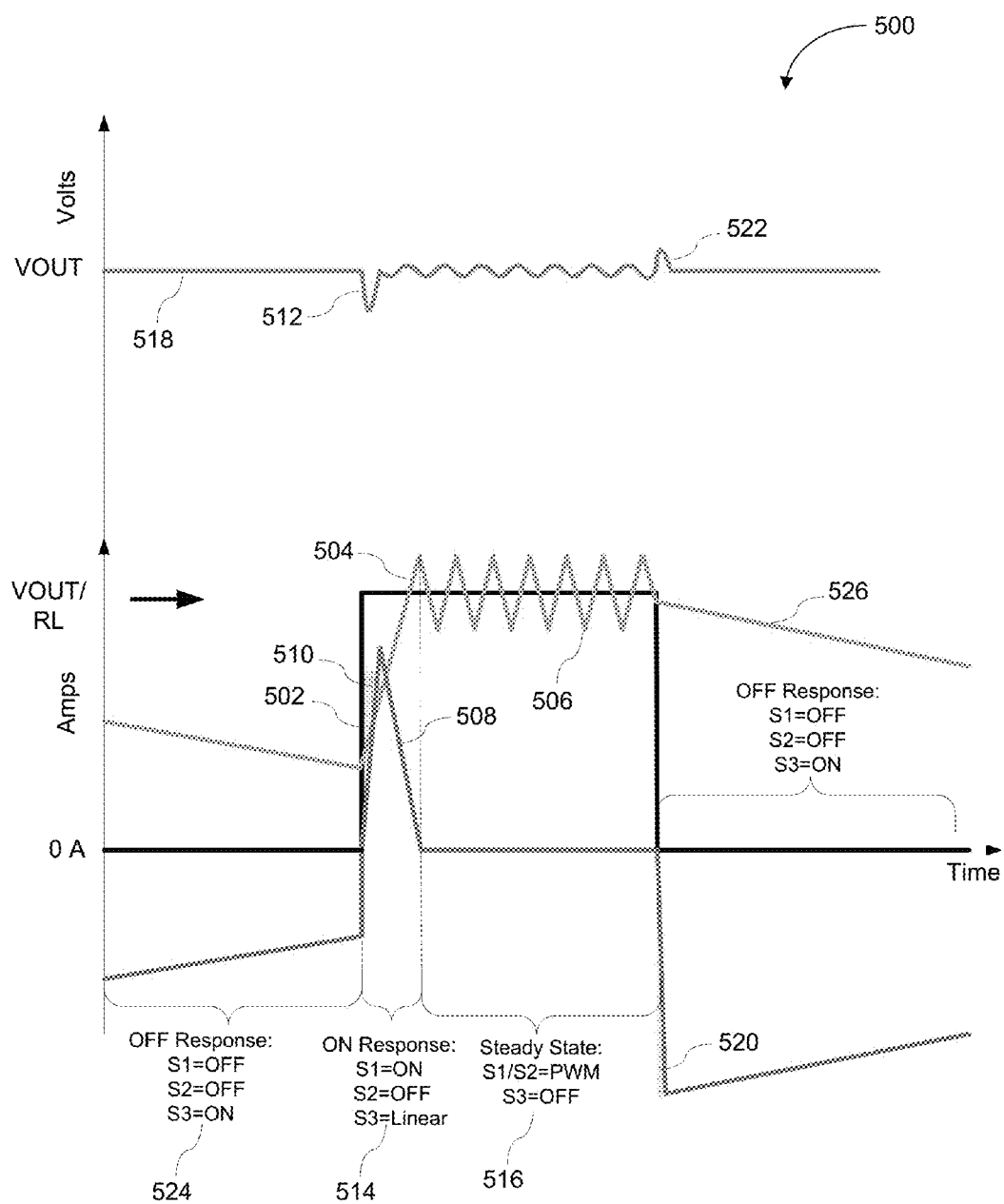
FIG. 5 shows exemplary voltage and current output waveforms of a buck converter in response load transients according to various embodiments.

FIG. 5 shows exemplary voltage and current output waveforms of a buck converter, such as the buck converter depicted in FIG. 4, in response to a positive and a negative load transient according to various embodiments. In response to a positive load transient caused by, for example, connecting a resistive load to the output of the buck converter, output load current 502 instantly steps from 0 A to $V_{OUT}/R_L$. Output voltage 518 depicts the voltage present at the output capacitor C1. Although inductor current 504 is rate limited by a slew rate, the bi-directional switch allows for an additional current path for current 508 that flows parallel to inductor current 504. Current 508 that passes through the bi-directional switch increases the rate at which current 502 becomes available to the output load. As inductor current 504 increases, the amount of current 508 passing through the bi-directional switch is reduced until the inductor current 504 overlaps with 508 in a manner that the sum of both currents equals the current demanded by the system load. The increase in the positive output current slew rate results in a reduced output voltage undershoot 512 that exists during ON response time 514.

In FIG. 5, area 510 is proportional to the charge removed from the output capacitor C1. This charge is proportional to output voltage undershoot 512. Because additional current 508 is provided through the bi-directional switch during ON response time 514, less inductor current 504 is needed to recharge the output capacitor C1. Therefore, output voltage undershoot 512 is significantly reduced, and inductor current 504 exceeds output load current 502 less than when compared to the typical output voltage undershoot of a prior art buck converter. As a result, output capacitor C1 can be designed to have a smaller capacitance than in prior art buck converters.

At steady state 516, switch S3 remains turned OFF and the controller alternates between turning ON switches S1 and S2 in a standard duty cycle to maintain an average inductor current that is equal to the output current. In response to a negative load transient following the steady state condition, output load current 502 may instantly step from $V_{OUT}/RL$ to 0 A, while inductor current 504 decreases with slight negative slope 526 from its steady state level $V_{OUT}/R_L$ to a level determined by the voltage drop across switch S3. The inductor current slew rate during OFF response time 524 is determined by the voltage drop across switch S3 and the inductor DC winding resistance (RDC) as:

$$\frac{d(I_{L1})}{dt} = \frac{\Delta I_{L1}}{\Delta T_{OFF}} = \frac{V_{S3}}{L1} = \frac{I_{L1} * [RDS_{S3} + RDC]}{L1}$$

wherein $RDS_{S3}$ is the DC resistance of switch S3 and RDC is the inductor's DC winding resistance. Output voltage overshoot 522 depicts the increased output voltage present at the output capacitor C1 for negative load transients. Area 520 is proportional to the charge added to the output capacitor and proportional to output voltage overshoot 522. Inductor current 504 will decay to zero when ON response time 514 is equal to or exceed a maximum OFF response time defined as:

$$T_{OFF(MAX)} = \frac{I_{L1} * L1}{V_{S3}} = \frac{I_{L1} * L1}{I_{L1} * [RDS_{S3} + RDC]} = \frac{L1}{RDS_{S3} + RDC}$$

At $T_{OFF(MAX)}$ the energy stored in the inductor is lost.

In one embodiment, ON response time 514 is adjusted to prevent output voltage 518 from deviating beyond a predetermined value, which further reduces the power consumption of the buck converter.

Figure 6:
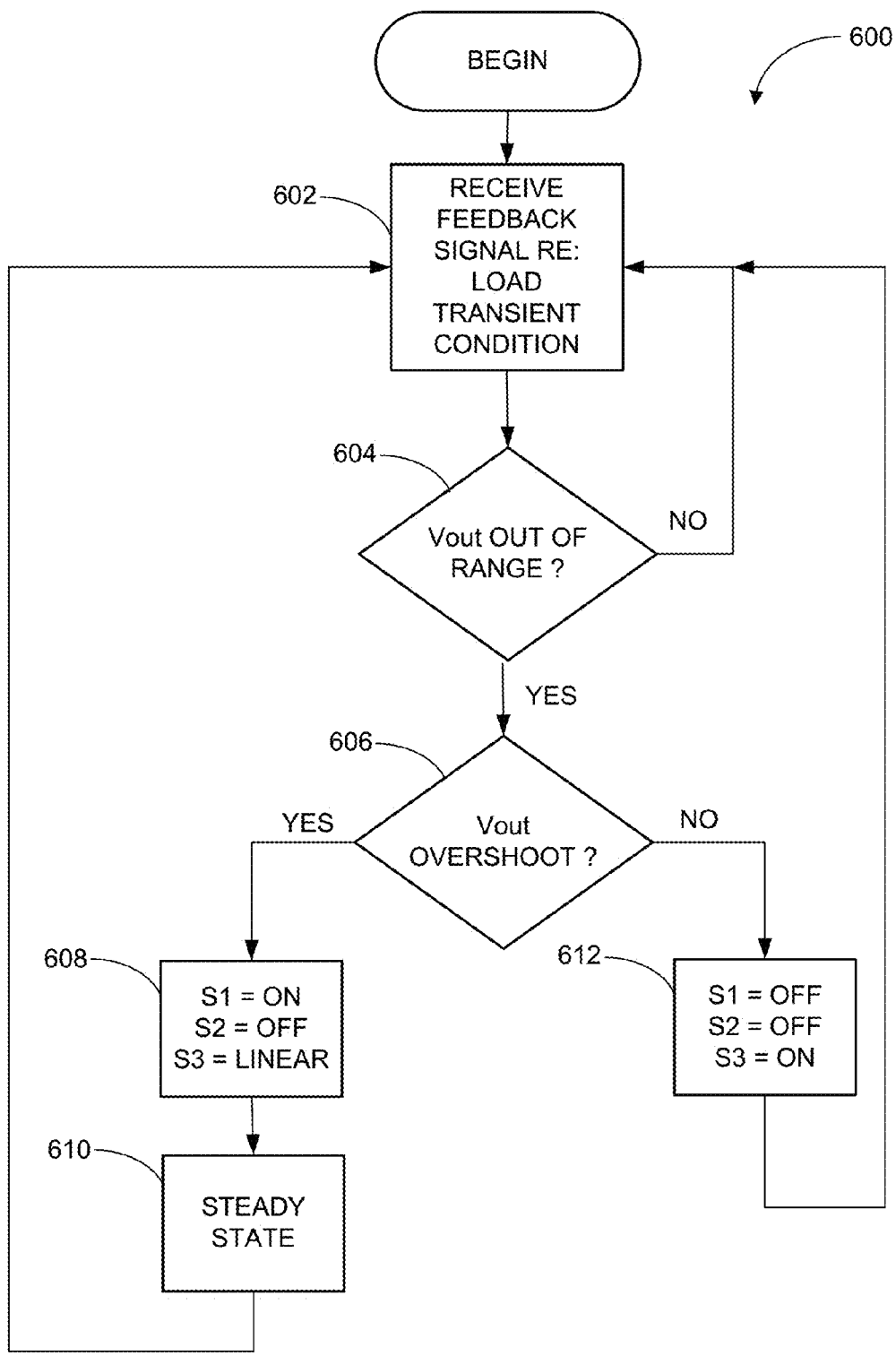
FIG. 6 is a flowchart of an illustrative process for reducing transient load responses in DC-DC buck voltage converters in accordance with various embodiments of the invention.

FIG. 6 is a flowchart of an illustrative process for reducing transient load responses in DC-DC buck voltage converters in accordance with various embodiments of the invention.

At step 602, the controller receives a signal regarding a load transient condition.

At step 604, the controller determines whether the output voltage of the DC-DC buck voltage converter exceeds a predetermined range.

If the DC-DC buck voltage converter falls outside a predetermined range, then, at step 606, the DC-DC buck voltage converter determines whether the outside exceeds a predetermined value.

If the predetermined value is a negative output voltage as determined by the feedback signal, then, at step 608, the controller activates a first switch S1 to turn ON, a second switch S2 to turn OFF, and a third switch S3 to operate in a linear voltage regulation mode until, at step 610, a load current is stabilized to operate in a steady state condition by turning switch S3 OFF and timing the duty cycle of switches S1 and S2 to alternately turn ON to maintain an average output current.

If at step 606 the predetermined value is a positive output voltage, then, at step 808, the controller activates the first switch S1 to turn OFF, the second switch S2 to turn OFF, and the third switch S3 to turn ON until, in a subsequent step 606 the predetermined value is again a negative output voltage.

It will be appreciated to those skilled in the art that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the claims in the future non-provisional application will include all such modifications, permutation and equivalents as fall within the true spirit and scope of the present invention.

I claim:

1. A DC-DC converter circuit to generate an output voltage for a system load, the DC-DC converter circuit comprising:
   an inductive element coupled between an input and an output of the DC-DC converter circuit;
   first and second switches coupled to the inductive element, the switches selectively turn ON and OFF in a predetermined sequence;
   a third switch coupled in parallel to the inductive element; and
   a controller coupled to the first, the second, and the third switches, the controller comprises circuitry to generate control signals that selectively activate the third switch in response to the controller detecting a polarity of a load transient event to maintain a circulating current between the third switch and the inductive element until operating the third switch in a linear voltage regulation mode to adjust a current supplied through the third switch.

2. The converter circuit according to claim 1, wherein the inductive element comprises a plurality of inductors.

3. The converter circuit according to claim 1, wherein the third switch comprises a bidirectional switch that allows a bidirectional current to flow through it.

4. The converter circuit according to claim 1, wherein the controller comprises circuitry to control an amount of energy stored in the inductive element.

5. The converter circuit according to claim 1, wherein the third switch is activated in a non-steady state to prevent the output voltage from exceeding a predetermined value.

6. The converter circuit according to claim 1, wherein a voltage across the third switch is used to adjust an inductor current slew rate.

7. The converter circuit according to claim 1, wherein in the linear voltage regulation mode the current flowing through the third switch decreases as the current in the inductive element increases until the sum of both currents substantially equals the current delivered to the system load.

8. The converter circuit according to claim 1, wherein the third switch is inactive in a steady state part of a cycle in which the first and second switch are alternately turned on to maintain an average current through the inductive element that equals a system load current.

9. The converter circuit according to claim 1, wherein the controller selectively activates the first, second, and third switches in response to a feedback signal.

10. The converter circuit according to claim 9, wherein the controller activates the third switch in response to a feedback signal representative of a negative load transient.

11. A DC-DC converter system comprising:
    a voltage source that provides a voltage signal;
    a DC-DC converter circuit, coupled to the voltage source, the DC-DC converter circuit comprises:
    an inductive element coupled between an input and an output of the DC-DC converter circuit, the inductive element stores and releases energy in relation to DC power at the output of the DC-DC converter circuit;
    a switch coupled in parallel to the inductive element, the switch configured to operate as a variable resistor in a linear voltage mode; and
    a controller coupled to a plurality of switches, the controller generates control signals hat selectively activate the switch in response to the controller detecting a polarity of one or more of the load transient events to maintain a circulating current through the inductive element immediately prior to switching to the linear voltage mode.

12. The converter system according to claim 11, wherein the controller comprises circuitry to both detect the polarity of the one or more load transient events and control an amount of energy stored in the inductive element.

13. A method to control transient responses of a DC-DC buck voltage converter, the method comprising:
    monitoring a transient load condition at an output of the buck voltage converter;
    determining from a polarity of the transient load condition whether an output voltage exceeds a predetermined threshold voltage;
    in response to the predetermined threshold voltage having a first polarity, activating a first switch operating as a variable resistor to maintain a circulating current to pass through the first switch and through at least one energy storage element coupled in parallel with the first switch;
    activating a plurality of switches that switch in a predetermined sequence in relation to an energy stored in the energy storage element;
    in response to the predetermined threshold voltage having a second polarity, activating the first switch to allow the current to circulate between the switch and the at least one energy storage element immediately prior to activating the first switch operating as a variable resistor and
    in response to a transient change, opening the first switch to release energy to a system load.

14. The method according to claim 13, wherein the first switch remains active until the predetermined threshold voltage turns negative.

15. The method according to claim 13, further comprising preventing the output voltage of the buck voltage converter from dropping below a minimum voltage.

16. The method according to claim 13, further comprising adjusting the output voltage to a desired level in response to receiving a feedback signal comprising the predetermined threshold voltage.

17. The method according to claim 13, further comprising deactivating the first switch in response to determining a steady state condition.

18. The method according to claim 13, further comprising maintaining a negative current in a direction opposite to a linear voltage regulation mode to store energy within the energy storage element.

* * * * *